(12) United States Patent
Lee

(10) Patent No.: US 6,928,310 B2
(45) Date of Patent: Aug. 9, 2005

(54) APPARATUS FOR SUPPLYING POWER TO MOBILE PHONE USING EARPHONE-MICROPHONE CONNECTOR

(75) Inventor: Dong-Joon Lee, Seoul (KR)

(73) Assignee: Samsung Electronics Co., Ltd. (KR)

( * ) Notice: Subject to any disclaimer, the term of this patent is extended or adjusted under 35 U.S.C. 154(b) by 277 days.

(21) Appl. No.: 10/417,528

(22) Filed: Apr. 17, 2003

(65) Prior Publication Data

US 2003/0211869 A1 Nov. 13, 2003

(30) Foreign Application Priority Data

May 8, 2002 (KR) ........................................ 2002-25226

(51) Int. Cl.[7] ................................................ H03F 3/45
(52) U.S. Cl. ...................... 455/572; 455/557; 455/559; 455/571; 455/574; 455/343.1; 455/343.2; 455/343.6; 379/438; 379/433.05; 439/218
(58) Field of Search ................................ 455/571, 572, 455/573, 559, 343.1, 343.2, 343.6; 439/218; 379/438, 433.05

(56) References Cited

U.S. PATENT DOCUMENTS

| | | | | |
|---|---|---|---|---|
| 6,184,652 B1 | * | 2/2001 | Yang | ........................... 320/110 |
| 6,203,344 B1 | * | 3/2001 | Ito | ............................... 439/218 |
| 6,211,649 B1 | * | 4/2001 | Matsuda | ...................... 320/115 |
| 6,616,300 B1 | * | 9/2003 | Hrabal | ........................ 362/258 |
| 6,633,932 B1 | * | 10/2003 | Bork et al. | .................... 710/72 |

OTHER PUBLICATIONS

MCM Electronics Catalog, 2001 (3 pages).*

* cited by examiner

*Primary Examiner*—Ahmad F. Matar
*Assistant Examiner*—Marie C. Ubiles
(74) *Attorney, Agent, or Firm*—Dilworth & Barrese LLP

(57) ABSTRACT

An apparatus for supplying power to a mobile phone by utilizing an external power source when a battery of the mobile phone has been exhausted. In a mobile phone having an earphone-microphone connector which can be connected with an earphone-microphone set, the earphone-microphone connector has additional contacts through which external power can be supplied to the mobile phone from an external power source, especially from another mobile phone. Therefore, even when the battery of the mobile phone has been exhausted, a user can make communication through the mobile phone by utilizing external electric power in a simple and easy manner, without largely changing the existing construction of the mobile phone.

8 Claims, 8 Drawing Sheets

APPARATUS FOR SUPPLYING POWER TO MOBILE PHONE USING EARPHONE-MICROPHONE CONNECTOR

PRIORITY

This application claims priority to an application entitled "Apparatus For Supplying Power To Mobile Phone Using Earphone-Microphone Connector" filed in the Korean Industrial Property Office on May 8, 2002 and assigned Serial No. 2002-25226, the contents of which are hereby incorporated by reference.

BACKGROUND OF THE INVENTION

1. Field of the Invention

The present invention relates to a mobile phone, and more particularly to an apparatus for supplying power to a mobile phone by utilizing an external power source.

2. Description of the Related Art

According to continuous development and progress in wireless communication technology and semiconductor manufacturing technology, mobile phones are growing lighter and more compact and coming to have more functions. Actually, a mobile phone is nowadays an indispensable communication appliance in daily life. However, it is very inconvenient and even dangerous for a user to perform communication with a mobile phone in his or her hand in some situations. For example, it is potentially very dangerous for a person to communicate while driving with a mobile phone in his or her hand. Therefore, most mobile phones are provided with an earphone-microphone connector which can be connected with an external earphone-microphone set. The earphone-microphone connector is usually a connector socket which has standardized dimension and shape.

FIG. 1 is a diagram illustrating an electric construction of a conventional earphone-microphone set.

Referring to FIG. 1, the conventional earphone-microphone set includes an earphone 7, a microphone 6, and a plug 5, and the plug 5 includes four electrical nodes 1, 2, 3, and 4. One end of the earphone 7 is connected with the node 1, and the other end of the earphone 7 is connected with the node 4. Further, one end of the microphone 6 is connected with the node 2, and the other end of the microphone 6 is connected with the node 3. The plug 5 has a construction suitable for insertion into a socket-type earphone-microphone connector provided at a mobile phone.

FIG. 2 is a diagram illustrating an internal construction of a conventional earphone-microphone connector socket in a usual mobile phone, and FIG. 3 is a diagram schematically illustrating an internal circuit of the earphone-microphone connector socket shown in FIG. 2.

As shown, the earphone-microphone connector socket 10 includes four internal contacts 11, 12, 15, and 16, which can be connected with the corresponding nodes 2, 1, 3, and 4 of the earphone-microphone set shown in FIG. 1, respectively, and additional internal contacts 13 and 14 which are used in detecting the insertion of the earphone-microphone set into the earphone-microphone connector socket.

Referring to FIG. 3, when the earphone-microphone set is not inserted in the earphone-microphone connector socket, the internal contact 13 is physically short-circuited to the internal contact 12 while the internal contact 14 is physically short-circuited to the internal contact 15. In FIG. 3, this short-circuited state is represented by arrows of the internal contacts 13 and 14 in contact with the internal contacts 12 and 15, respectively. In this case, the internal contacts 13 and 16 are connected with a speaker on the mobile phone body, and the internal contacts 11 and 14 are connected with a microphone on the mobile phone body.

In this case, most of the voltage AVcc is applied to the microphone of the mobile phone body, which has a relatively large resistance of about 2.2 k$\Omega$, so that the internal contact 14 is maintained in the LOW state. As a result, an NPN Field Effect Transistor (FET) Q, which has a gate input G1, a source S1, and a drain D1, is utilized as follows. When the gate input G1, which is a status signal of the internal contact 14, is off, and the signal JACK_IN supplied to a control section or coder/decoder (CODEC) of the mobile phone, is shifted to the HIGH state by the voltage Vdd, the signal JACK_IN maintains the mobile phone in a general communication mode, and not in a communication mode, where the user communicates through the earphone-microphone set.

When the plug 5 of the earphone-microphone set, which has the nodes 1, 2, 3, and 4 as shown in FIG. 1, is inserted in the earphone-microphone connector socket 10, the force of the inserted plug separates the internal contact 13 from the internal contact 12 and the internal contact 14 from the internal contact 15, thereby disconnecting the internal contact 12 and the internal contact 15 from the speaker and the microphone of the mobile phone body, respectively. Simultaneously, the internal contacts 12 and 16 are connected with the earphone 7 through the nodes 1 and 4, and the internal contacts 11 and 15 are connected with the microphone 6 through the nodes 2 and 3. In this case, the internal contact 14 is shifted to the HIGH state by a pull-up resistor R1 between the internal contact 14 and AVcc. Therefore, the signal JACK_IN is connected with the ground through the drain D1 and source S1 of the NPN Field Effect Transistor Q, the gate input G1 of which is connected to the a status signal of the internal contact 14, so that the signal JACK_IN shifts to the LOW state. The signal JACK_IN shifts the mobile phone into the communication mode through the earphone-microphone set.

As explained above, the function of the conventional earphone-microphone connector is to connect the earphone-microphone set and the mobile phone. Typically, the earphone-microphone connector does not perform any other function. As explained above, once this connection is made the mobile phone can be operated in the communication mode, which leaves the user's hands free to perform other tasks.

In the meantime, most mobile phones employ a rechargeable battery as an electric power source to provide portability. However, the rechargeable battery has limited capacity, depending on the kind and lifespan of the battery. Accordingly, the mobile phone cannot be used once the battery is discharged. Moreover, since the batteries of mobile phones usually have different shapes and power capacities, according to manufacturer and model of the battery, it is almost impossible for a mobile phone to utilize a different battery from another mobile phone in place of its own battery. In order to solve this problem, there have been various efforts and research into developing a technology which can enable a mobile phone to be recharged regardless of the kind of the battery used. However, it is still a common case that a user of a mobile phone cannot recharge the battery of the mobile phone, due to his or her situation or location. In this case, the user cannot help using a public phone or borrowing another person's mobile phone.

SUMMARY OF THE INVENTION

Accordingly, the present invention has been made to solve the above-mentioned problems occurring in the prior art, and an object of the present invention is to provide an apparatus which enables a mobile phone to receive electric power when a battery of the mobile phone has been discharged.

It is another object of the present invention to provide an apparatus which enables a mobile phone to receive electric power through an earphone-microphone connector of the mobile phone.

It is another object of the present invention to provide an apparatus which enables a mobile phone to receive electric power through an earphone-microphone connector of the mobile phone while communication is being performed through the mobile phone.

It is another object of the present invention to provide an apparatus which enables a mobile phone to receive electric power from another mobile phone.

In order to accomplish these objects, there is provided an apparatus for supplying power to a mobile phone having an earphone-microphone connector which can be connected with an earphone-microphone set, the apparatus comprising: a first plug which can be connected in parallel with a power supply section of a first mobile phone through an earphone-microphone connector of the first mobile phone; and a second plug which can be connected in parallel with a power supply section of a second mobile phone through an earphone-microphone connector of the second mobile phone, so as to supply electric power from the power supply section of the first mobile phone to the power supply section of the second mobile phone.

In accordance with another aspect of the present invention, there is provided an apparatus for supplying power to a mobile phone having an earphone-microphone connector which can be connected with an earphone-microphone set, the earphone-microphone connector comprising a first contact connected with a power node of a power supply section of the mobile phone and a second contact connected with a ground node of the power supply section, which can be connected with a plug for supplying electric power, wherein, when the plug is connected with the earphone-microphone connector, the first and second contacts are connected through the plug with an external power source, thereby supplying electric power from the external power source to the power supply section.

BRIEF DESCRIPTION OF THE DRAWINGS

The above and other objects, features and advantages of the present invention will be more apparent from the following detailed description taken in conjunction with the accompanying drawings, in which.

DETAILED DESCRIPTION OF THE PREFERRED EMBODIMENTS

Hereinafter, preferred embodiments of the present invention will be described in detail with reference to the accompanying drawings. In the following description of the present invention, details of well known functions and configurations are omitted to avoid making the subject matter of the present invention unclear.

The present invention, which will be described herein, provides a power supply cable which enables electric power to be supplied through a standard earphone-microphone connector socket of a mobile phone. Also, although a detailed description gives examples that relate to a wireless phone, such as a mobile phone, cellular phone, personal communication service (PCS) phone, or personal digital assistant (PDA) phone, the present invention is not limited to those phones but can be also employed in all kinds of portable appliances having a standard earphone-microphone connector, such as portable cassette players, MP3 players, CD players, etc.

Figure 4:
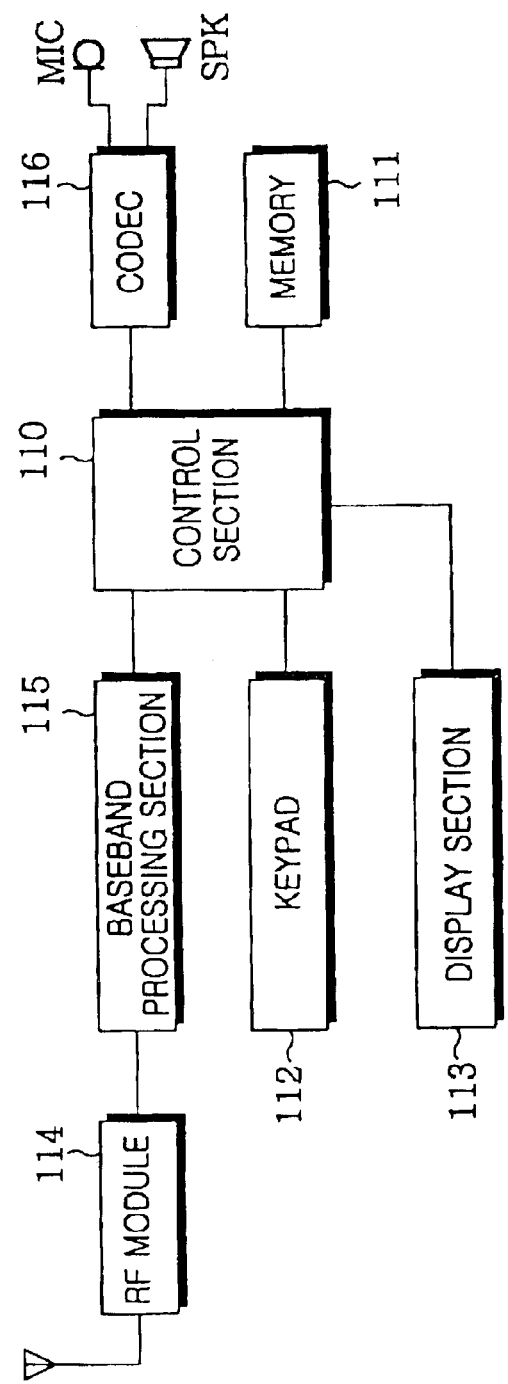
FIG. 4 is a block diagram of a mobile phone to which a power supply apparatus according to the present invention can be applied.

FIG. 4 is a block diagram of a mobile phone to which a power supply apparatus according to the present invention can be applied.

In the mobile phone shown in FIG. 4, a control section 110 which is connected with a memory 111, a keypad 112, a display section 113, an RF module 114, a baseband processing section 115, and a CODEC 116, controls each element of the mobile phone and processes voice signals and data for usual phone communication or data communication. The control section 110 described above, for example, a mobile system modem (MSM) chip such as that manufactured by QUALCOMM Inc., may be utilized.

The memory 111, which is connected with the control section 110 and can include an Electrically Erasable and Programmable ROM (EEPROM), a flash memory, and a random access memory (RAM), etc., stores various reference data and programs necessary in the processing and controlling operation of the control section 110, and provides a working memory of the control section 110.

The keypad 112 includes various keys including number keys, thereby supplying key input signals inputted by a user to the control section 110. The display section 113 is usually an LCD that displays images containing various information.

The RF module 114 transmits and receives RF (radio frequency) signals to and from a base station through an antenna. The RF module 114 converts a received RF signal to an IF (intermediate frequency) signal and outputs it to the baseband processing section 115, and converts an IF signal received from the baseband processing section 115 to an RF signal and transmits it through the antenna. The baseband processing section 115 is a BBA (baseband Analog ASIC) which provides an interface between the control section 110 and the RF module 114. The baseband processing section 115 converts a digital baseband signal received from the control section 110 to an analog IF signal and applies the analog IF signal to the RF module 114, and converts an analog IF signal received from the RF module 114 to a digital baseband signal and applies the baseband digital signal to the control section 110.

The CODEC 116 connected with the control section 110 is connected with a microphone and speaker of the mobile phone body or a microphone and speaker of the earphone-microphone set. The CODEC 116 outputs voice data, which is obtained by Pulse Code Modulation (PCM) encoding a voice signal inputted from the microphone, to the control section 110, and outputs a voice signal, which is obtained by PCM decoding voice data inputted from the control section 110, to the speaker. When the external earphone-microphone set is inserted in the earphone-microphone connector, the CODEC 116 detects it and passes the inputted or outputted voice signal to the external earphone-microphone set instead of the inner microphone or speaker. This means that the mobile phone has entered the communication mode through the earphone-microphone set. Meanwhile, although FIG. 4 shows the CODEC 116 constructed separately from the control section 110, the CODEC 116 may be constructed in the same chip in which the control section 110 is constructed.

All elements of the mobile phone operate by means of electric power supplied from the battery. As described already, batteries of mobile phones have different shapes and power capacities according to manufacturers and models of the batteries. However, since most mobile phones can operate without much trouble when an electric power with a voltage of 3.4 to 4.2 volts and an electric current of 600 to 900 mA is supplied to them, a mobile phone can be used in communication as long as an electric power with the above-mentioned voltage and current is supplied to it, even though the electric power is supplied from a battery of a different kind of mobile phone with a different shape and different connection nodes. In consideration of this point, the present invention enables a mobile phone to receive an external electric power through an earphone-microphone set having standard shape and dimension.

However, as described above, when any type of plug is connected with the earphone-microphone connector, the mobile phone recognizes this as the earphone-microphone set and automatically shifts to the communication mode through the earphone-microphone set. Therefore, an apparatus which can enable communication through the mobile phone, i.e. in the general communication mode, simultaneous to supplying electric power to the mobile phone through the earphone-microphone connector is necessary.

The present invention discloses an electric power cable having two plugs, each having similar construction, connected with each other through electric wires. Each of the two plugs can be connected with an earphone-microphone connector of a mobile phone. In this case, each of the two plugs is preferably longer than a plug of a usual earphone-microphone set, so as to prevent the mobile phone from shifting to the communication mode through the earphone-microphone set when the plug is inserted into the earphone-microphone connector socket. Further, the mobile phone is in the communication mode through the earphone-microphone set when the plug of the conventional earphone-microphone set is inserted at its relatively shallow depth in the earphone-microphone connector socket, while the mobile phone will remain in or return to the general communication mode when the longer plug of the invention is inserted relatively deeply in the earphone-microphone connector.

Figure 5:
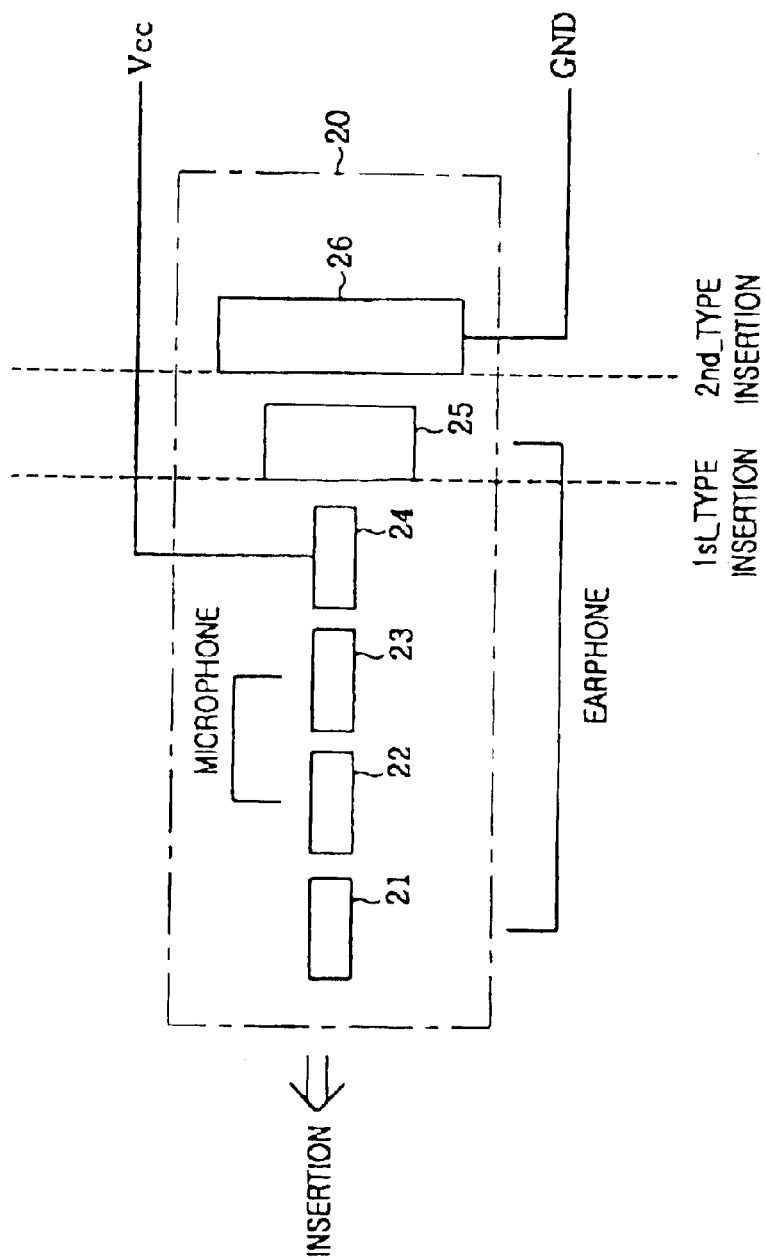
FIG. 5 is a diagram illustrating an electric construction of one plug of an electric power cable according to the present invention.

FIG. 5 is a diagram illustrating an electric construction of one plug of the electric power cable according to the present invention, which is identical to an electric construction of the other plug of the electric power cable.

The plug 20 shown in FIG. 5 includes two more nodes 24 and 26 in addition to the four nodes 21, 22, 23, and 25 which are common elements of the plug of the conventional earphone-microphone set. Making a comparison between the plug 20 and the conventional plug 5 shown in FIG. 1, the nodes 21 and 25 correspond to the nodes 1 and 4 for the earphone while the nodes 22 and 23 correspond to the nodes 2 and 3 for the microphone.

The plug 20 has a shape that extends further than the plug 5 of the usual earphone-microphone set. Therefore, when the plug 20 has been inserted only to the node 25 (hereinafter, referred to as "first-type insertion"), only the four nodes 21, 22, 23, and 25 are in contact with corresponding internal contacts. Further, when the plug 20 has been inserted to the node 26 (hereinafter, referred to as "second-type insertion"), the nodes 24 and 26 are in contact with corresponding internal contacts and utilized in supplying electric power.

The additional node 24 is used as a power node, and the additional node 26 is used as a ground node. The two nodes 24 and 26 are connected with corresponding nodes of the plug at the other side, respectively. The plug 20 described above has a construction suitable to be connected with the conventional earphone-microphone connector socket.

Figure 6:
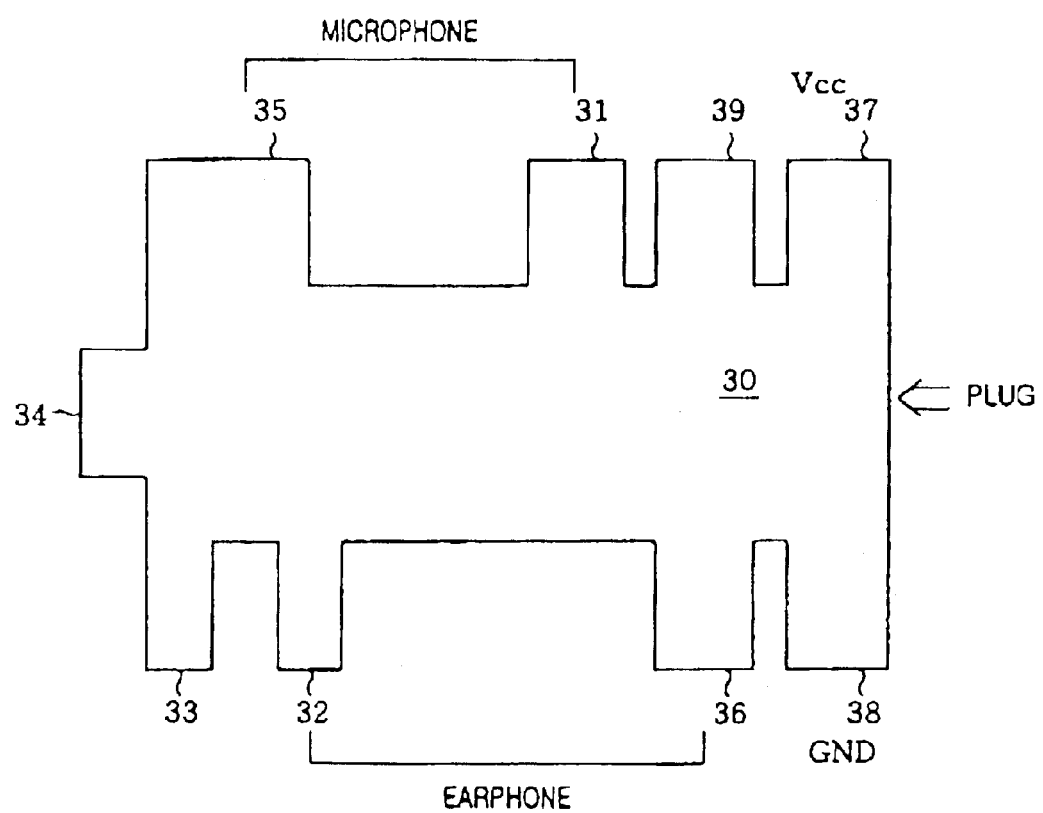
FIG. 6 is a diagram illustrating an internal construction of an earphone-microphone connector socket of a mobile phone according to the present invention.
Figure 7:
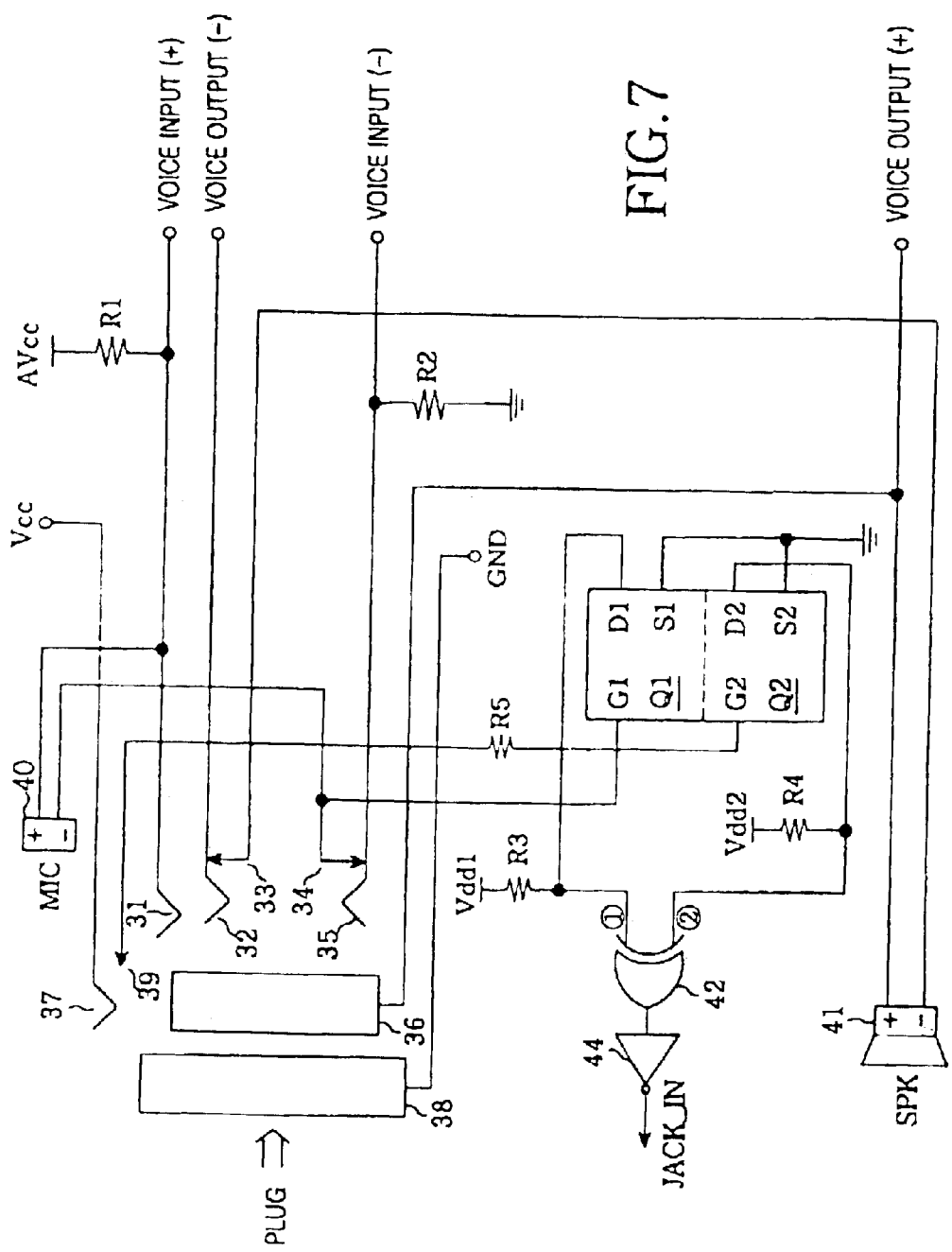
FIG. 7 is a diagram schematically illustrating an internal circuit of the earphone-microphone connector socket shown in FIG. 6.

FIG. 6 is a diagram illustrating an internal construction of an earphone-microphone connector socket of a mobile phone according to the present invention, and FIG. 7 is a diagram schematically illustrating an internal circuit of the earphone-microphone connector socket shown in FIG. 6.

As shown, an earphone-microphone connector socket 30 includes six internal contacts 31, 32, 35, 36, 37, and 38, which can be connected with the corresponding nodes 22, 21, 23, 25, 24, and 26 of the earphone-microphone set shown in FIG. 5, respectively, and three additional internal contacts 33, 34, and 39 which are used in detecting the insertion of the earphone-microphone set or power supply cable. In this case, the internal contact 37 is connected with the power node Vcc of the battery and the internal contact 38 is connected with the ground node of the battery in the mobile phone.

Referring to FIG. 7, when any plug of the earphone-microphone set is not inserted in the earphone-microphone connector socket, the internal contact 33 is physically short-circuited to the internal contact 32 while the internal contact 34 is physically short-circuited to the internal contact 35. In this case, the internal contacts 33 and 36 are connected with a speaker of the mobile phone body, and the internal contacts 31 and 34 are connected with a microphone of the mobile phone body. Further, the internal contact 39 is physically spaced apart from the internal contact 37. In FIG. 7, this state is represented by arrows of the internal contacts 33 and 34 in contact with the internal contacts 32 and 35, respectively, and an arrow for the internal contact 39, which is separated from the internal contact 37.

In this case, most of the voltage AVcc is applied to the microphone of the mobile phone body, which has a relatively large resistance of about 2.2 k$\Omega$, so that the internal contact 34 is maintained at the LOW state. Therefore, an NPN Field Effect Transistor Q1, which has G1, S1, and D1, and a gate input G1 of which is a status signal of the internal contact 34, is off, and the first input ① of an exclusive OR gate 42 is in the HIGH state due to the voltage Vdd1. Meanwhile, the internal contact 39 is in the LOW state, since the internal contact 39 is not electrically connected to anything. Therefore, an NPN Field Effect Transistor Q2 (which has G2, S2, and D2), a gate input G2 of which is a status signal of the internal contact 39, is in the off state, and the second input ② of the exclusive OR gate 42 is also in the HIGH state due to the voltage Vdd2. As a result, the signal JACK_IN outputted from an inverter 44 and supplied to a control section or CODEC of the mobile phone is in the HIGH state. The signal JACK_IN maintains the mobile phone in the general communication mode, not in the communication mode through the earphone-microphone set.

Figure 1:
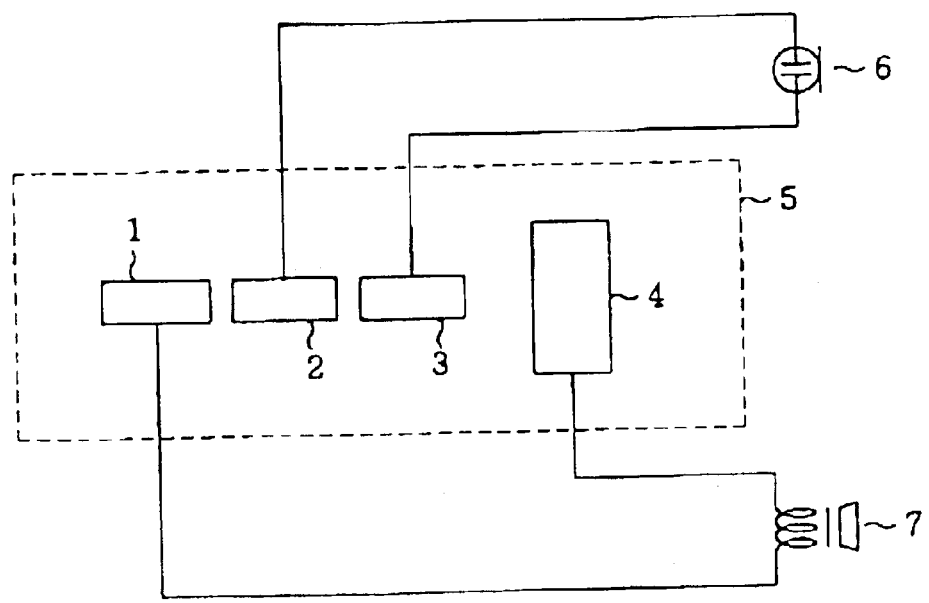
FIG. 1 is a diagram illustrating an electric construction of a conventional earphone-microphone set.
Figure 2:
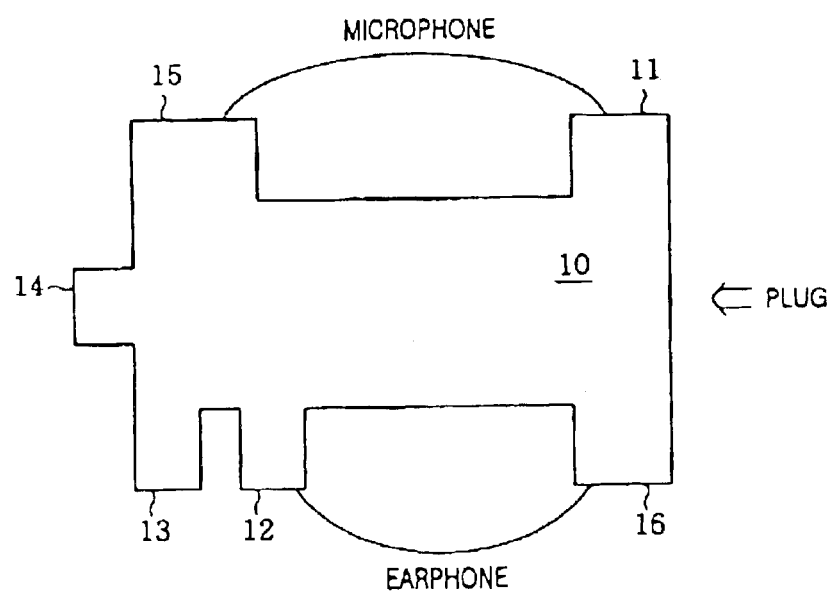
FIG. 2 is a diagram illustrating an internal construction of a conventional earphone-microphone connector socket in a usual mobile phone.
Figure 3:
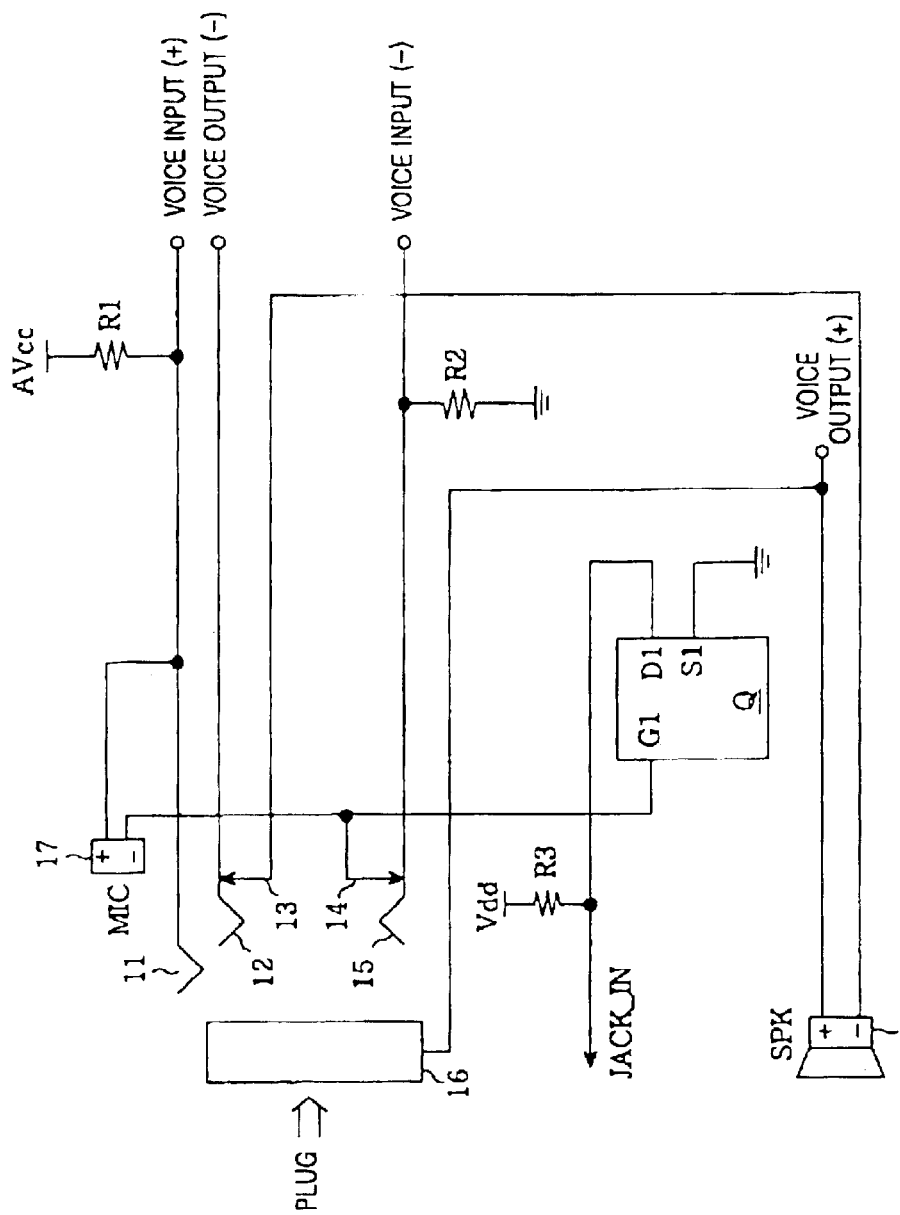
FIG. 3 is a diagram schematically illustrating an internal circuit of the earphone-microphone connector socket shown in FIG. 2.

When the plug 5 of the conventional earphone-microphone set, which has the nodes 1, 2, 3, and 4 as shown in FIG. 1, is inserted in the earphone-microphone connector socket 30, or when one plug 20 of the power supply cable, which has the nodes 21, 22, 23, 24, 25, and 26, is first-type inserted, that is, inserted only to the depth of node 25, the force of the inserted plug separates the internal contact 33 from the internal contact 32 and the internal contact 34 from the internal contact 35, thereby disconnecting the internal contact 32 and the internal contact 35 from the speaker and the microphone of the mobile phone body, respectively.

In this case, the internal contact 34 is shifted to the HIGH state by a pull-up resistor R1 between the internal contact 34 and AVcc. Therefore, the NPN Field Effect Transistor Q1, the gate input G1 of which is a status signal of the internal contact 34, is turned on. Since the source S1 of the transistor Q1 is now connected to the ground, the first input ① of an exclusive OR gate 42 which is connected with the drain D1 of the transistor Q1 goes to the LOW state. Meanwhile, the second input ② of the exclusive OR gate 42 is still in the HIGH state. As a result, the signal JACK_IN outputted from the inverter 44 and supplied to a control section or CODEC of the mobile phone goes to the LOW state. The signal JACK_IN shifts the mobile phone into the communication mode through the earphone-microphone set.

Finally, when plug 20 of the power supply cable, which has the nodes 21, 22, 23, 24, 25, and 26 as shown in FIG. 5, is second-type inserted, that is, inserted up to the node 26, the force of the inserted plug causes the internal contacts 39 and 37 to be short-circuited to each other. However, the internal contact 33 and the internal contact 34 are still separated from the internal contact 32 and the internal contact 35, respectively.

In this case, the first input ① of an exclusive OR gate 42 is still in the LOW state, while the internal contact 39 is shifted to the HIGH state by the internal contact 37, since the internal contact 37 is connected with the power node Vcc in the mobile phone. Even when the battery of the mobile phone has been discharged and it is impossible to further communicate through the mobile phone, the power node will typically possess sufficient voltage to determine that it is in the logical HIGH state. Also, even when the battery has been completely exhausted, the internal contact 37 can receive electric power through the power supply cable from another mobile phone connected with the other side plug of the power supply cable.

Therefore, the NPN Field Effect Transistor Q2, a gate input G2 of which is the status signal of the internal contact 39, is turned on. Since the source S2 of the transistor Q2 is connected to the ground, the second input ② of the exclusive OR gate 42, which is connected with the drain D2 of the transistor Q2, is in the LOW state. As a result, the signal JACK_IN outputted from the inverter 44 and supplied to the control section or CODEC of the mobile phone is in the HIGH state. The signal JACK_IN shifts the mobile phone into the general communication mode and enables the mobile phone to receive electric power through the power supply cable from another mobile phone connected with the power supply cable.

Mode shift states of the mobile phone according to the insertion of the plug are shown in Table 1 below.

TABLE 1

|  | Not inserted | First-type insertion | Second-type insertion |
| --- | --- | --- | --- |
| G1 | LOW | HIGH | HIGH |
| D1 | HIGH | LOW | LOW |
| G2 | LOW | LOW | HIGH |
| D2 | HIGH | HIGH | LOW |
| JACK_IN | HIGH | LOW | HIGH |
| Mode | General mode | Through-earphone mode | General mode (power supplied) |

Figure 8:
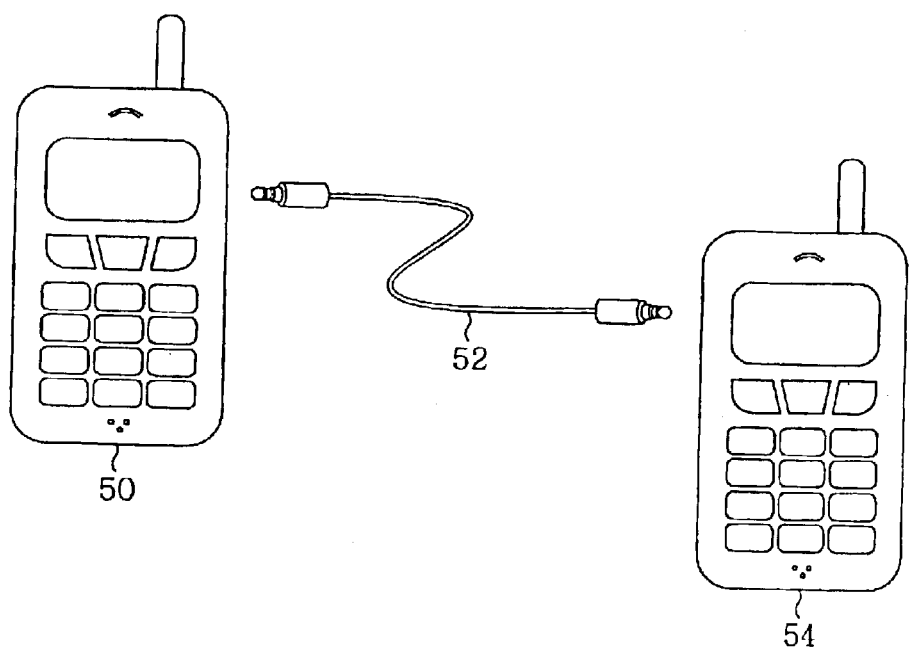
FIG. 8 is a view showing the connection of the power supply cable according to the present invention.

FIG. 8 is a view showing the connection of the power supply cable according to the present invention.

As shown, one plug of the power supply cable 52 is inserted in an earphone-microphone connector socket of a mobile phone 50, while the other plug of the power supply cable 52 is inserted in an earphone-microphone connector socket of another mobile phone 54. Then, a battery of the mobile phone 50 is connected in parallel with a battery of the mobile phone 54. Therefore, even when the battery of the mobile phone 50 has been completely discharged, communication can be made by the mobile phone 50 by borrowing power from the battery of the mobile phone 54. In this case, the parallel connection allows only the capacity of the battery to be increased but the voltage is not largely elevated, thereby causing no significant damage due to over-voltage on the circuit of the mobile phone. Further, since the connection is made in parallel, the voltage is not largely dropped even in the other mobile phone which provides electric power.

Hereinafter, representative effects of the present invention having the construction and operation as described above in detail will be described briefly.

The present invention provides a power supply cable which enables a mobile phone to utilize external electric power, thereby enabling a user to make a communication through a mobile phone even when a battery of the mobile phone has been exhausted, without borrowing either the battery from another mobile phone or the other phone itself.

Moreover, the present invention provides a power supply cable which can be manufactured at low cost and can be used regardless of communication type of the mobile phones, such as CDMA (Code Division Multiple Access), GSM (Global Standard Mobile), etc. In other words, the present invention enables a user to use his or her own mobile phone in communication by means of external electric power. Therefore, a user can conveniently use his or her own mobile phone without uneasiness due to insufficient lifespan of the battery.

While the invention has been shown and described with reference to certain preferred embodiments thereof, it will be understood by those skilled in the art that various changes in form and details may be made therein without departing from the spirit and scope of the invention as defined by the appended claims.

What is claimed is:

1. An apparatus for supplying power to a mobile phone having an earphone-microphone connector which can be connected with an earphone-microphone set, the apparatus comprising:

a first plug which can be connected in parallel with a power supply section of a first mobile phone through an earphone-microphone connector of the first mobile phone; and a second plug which can be connected in parallel with a power supply section of a second mobile phone through an earphone-microphone connector of the second mobile phone, so as to supply electric power from the power supply section of the first mobile phone to the power supply section of the second mobile phone.

2. An apparatus as claimed in claim 1, wherein the first plug comprises a first power node and a first ground node, which can be connected in parallel with the power supply section of the first mobile phone.

3. An apparatus as claimed in claim 2, wherein the second plug comprises a second power node and a second ground node, which can be connected in parallel with the power supply section of the second mobile phone, the second power node being connected with the first power node, the second ground node being connected with the first ground node.

4. An earphone-microphone connector of a mobile phone that can be connected with an earphone-microphone set or a power supply cable, the earphone-microphone connector comprising a first contact to be connected with a power node of a power supply section of the mobile phone and a second contact to be connected with a ground node of the power supply section, which can be connected with a plug of the power supply cable for supplying electric power, wherein, when the plug is connected with the earphone-microphone connector, the first and second contacts are connected through the plug with an external power source, thereby supplying electric power from the external power source to the power supply section.

5. An earphone-microphone connector as claimed in claim 4, wherein the external power source is a power supply section of another mobile phone.

6. An earphone-microphone connector as claimed in claim 4, wherein the earphone-microphone connector generates a signal for maintaining the mobile phone in a communication mode through the earphone-microphone set when the earphone-microphone set is connected with the earphone-microphone connector, and generates a signal for maintaining the mobile phone in a general communication mode when the plug is connected with the earphone-microphone connector.

7. An earphone-microphone connector as claimed in claim 4, wherein the earphone-microphone connector further comprises a third contact for maintaining the mobile phone in a general communication mode when the plug is connected with the earphone-microphone connector.

8. An earphone-microphone connector as claimed in claim 7, wherein the third contact comes into contact with the first contact and generates a signal for maintaining the mobile phone in a general communication mode when the plug is connected with the earphone-microphone connector.

* * * * *